US012559434B2

(12) United States Patent
Nwoke et al.

(10) Patent No.: US 12,559,434 B2
(45) Date of Patent: Feb. 24, 2026

(54) METHODS AND COMPOSITIONS FOR INHIBITING ALPHA CASE ON TITANIUM ALLOY SURFACES

(71) Applicant: The Boeing Company, Chicago, IL (US)

(72) Inventors: Dominic N. Nwoke, Puyallup, WA (US); Christopher E. Rivers, Bonney Lake, WA (US)

(73) Assignee: The Boeing Company, Arlington, VA (US)

( * ) Notice: Subject to any disclaimer, the term of this patent is extended or adjusted under 35 U.S.C. 154(b) by 436 days.

(21) Appl. No.: 17/684,490

(22) Filed: Mar. 2, 2022

(65) Prior Publication Data

US 2022/0315498 A1     Oct. 6, 2022

Related U.S. Application Data

(60) Provisional application No. 63/165,217, filed on Mar. 24, 2021.

(51) Int. Cl.
*C04B 41/50*        (2006.01)
*C04B 35/14*        (2006.01)
(Continued)

(52) U.S. Cl.
CPC .......... *C04B 41/5035* (2013.01); *C04B 35/14* (2013.01); *C04B 35/6455* (2013.01); *C04B 41/009* (2013.01)

(58) Field of Classification Search
CPC .................................................. C04B 41/5035
See application file for complete search history.

(56) References Cited

U.S. PATENT DOCUMENTS 3,454,433 A * 7/1969 Mueller ................... C21D 1/70
                                                            148/22
3,836,380 A * 9/1974 Kramer ................... C03C 12/00
                                                            427/403
(Continued)

FOREIGN PATENT DOCUMENTS

EP        0 914 884        5/1999
EP        1947217          7/2008

OTHER PUBLICATIONS

Musallam, Nicolás Fashho. Improvement of high temperature oxidation resistance of γTiAl alloys by slurry coatings. BS thesis. 2014. (Year: 2014).*

(Continued)

*Primary Examiner* — Nathan H Empie
(74) *Attorney, Agent, or Firm* — Walters & Wasylyna LLC

(57)                    ABSTRACT

A method for inhibiting alpha case on a titanium or titanium alloy article includes applying a ceramic coating to a surface of the article. The method further includes heating the article to a temperature of at least 800° F. while the ceramic coating is applied to the surface of the article. A method for manufacturing a titanium article that is substantially free of alpha case includes fabricating a preform by additive manufacturing, applying a ceramic coating to a surface of the preform, the ceramic coating having a nominal coating thickness of at least about 1 mil, subjecting the preform to hot isostatic pressing while the ceramic coating is applied to the surface, and removing the ceramic coating after hot isostatic pressing.

20 Claims, 7 Drawing Sheets

(51) Int. Cl.
    *C04B 35/645*       (2006.01)
    *C04B 41/00*        (2006.01)

(56)           References Cited

U.S. PATENT DOCUMENTS

| | | | | |
|---|---|---|---|---|
| 4,250,610 | A * | 2/1981 | Wilbers | C22F 3/00 |
| | | | | 29/527.2 |
| 5,298,332 | A * | 3/1994 | Andrus | C23C 24/10 |
| | | | | 427/397.8 |
| 2002/0193177 | A1 | 12/2002 | Poyner | |
| 2010/0330282 | A1 * | 12/2010 | Nienburg | C23C 24/08 |
| | | | | 427/292 |
| 2017/0027624 | A1 * | 2/2017 | Wilson | B33Y 80/00 |
| 2020/0391292 | A1 * | 12/2020 | Shuck | B22F 5/10 |
| 2020/0397589 | A1 | 12/2020 | Gallagher et al. | |

OTHER PUBLICATIONS

Webcapture from Jan. 4, 2014 from web archive: https://web.archive.org/web/20140104144102/https://www.merriam-webster.com/dictionary/clay (Year: 2014).*

European Patent Office, Extended European Search Report, App. No. 22159199.4 (Apr. 19, 2022).

\* cited by examiner

*300*

310 — FABRICATING

250 — PREFORM

320 — TREATING

255 — SURFACE

330 — APPLYING

220 — CERAMIC COATING

340 — AIR DRYING

350 — SUBJECTING

360 — REMOVING

| HV | mag ◻ | mode | WD | tilt | curr | HFW | |
|---|---|---|---|---|---|---|---|
| 10.00 kV | 6.500 x | SE | 10.8 mm | 0° | 0.13 nA | 45.9 µm | 10 µm |

1100

| SPECIFICATION AND DESIGN | 1104 |
| MATERIAL PROCUREMENT | 1106 |
| COMPONENT AND SUBASSEMBLY MFG. | 1108 |
| SYSTEM INTEGRATION | 1110 |
| CERTIFICATION AND DELIVERY | 1112 |
| IN SERVICE | 1114 |
| MAINTENANCE AND SERVICE | 1116 |

METHODS AND COMPOSITIONS FOR INHIBITING ALPHA CASE ON TITANIUM ALLOY SURFACES

PRIORITY

This application claims priority from U.S. Ser. No. 63/165,217 filed Mar. 24, 2021.

FIELD

This application relates to the manufacturing of titanium structures and, more specifically, to methods and compositions for inhibiting alpha case on titanium alloy surfaces.

BACKGROUND

Alpha case is a brittle surface layer that forms on the surface of titanium/titanium alloys when exposed to oxygen, carbon or nitrogen at temperatures above 1000° F., such as from 1200 to 1800° F. Currently, additive manufactured parts are chemically milled to remove alpha case on the surface. Chemical milling requires printing extra layers on a net-shaped part or oversizing the part to compensate based on the thickness of alpha case. This added thickness increases stress ratio, thermal gradient, build time, and final part dimensions. Other drawbacks to the current methods include cost, increased production time, exposure to hydrofluoric acid, surface defects creating a means for hydrofluoric acid to be trapped inside the surface, NOx emissions, proper disposal costs, and hydrogen embrittlement.

Accordingly, those skilled in the art continue with research and development efforts in the field of alpha case inhibition.

SUMMARY

Disclosed is a method for inhibiting alpha case on an article.

In one example, the disclosed method for inhibiting alpha case on an article includes applying a ceramic coating to a surface of the article, wherein the article includes titanium or titanium alloy. The method further includes heating the article to a temperature of at least 800° F. while the ceramic coating is applied to the surface of the article.

Also disclosed is a method for manufacturing a titanium article that is substantially free of alpha case.

In one example, the disclosed method for manufacturing a titanium article that is substantially free of alpha case includes fabricating a preform by additive manufacturing. The method further includes applying a ceramic coating to a surface of the preform, the ceramic coating having a nominal coating thickness of at least about 1 mil. The method further includes subjecting the preform to hot isostatic pressing while the ceramic coating is applied to the surface. The method further includes removing the ceramic coating after hot isostatic pressing.

Also disclosed is a slurry composition for inhibiting alpha case on titanium.

In one example, the disclosed slurry composition includes about 25 to about 50 percent by weight water, about 60 to about 70 percent by weight silicate, about 6 to about 10 percent by weight calcium, about 16 to about 19 percent by weight aluminum, about 0.3 to about 7 percent by weight iron, and about 1 to about 2 percent by weight titanium.

Other examples of the disclosed methods and compositions will become apparent from the following detailed description, the accompanying drawings, and the appended claims

DETAILED DESCRIPTION

Figure 1:
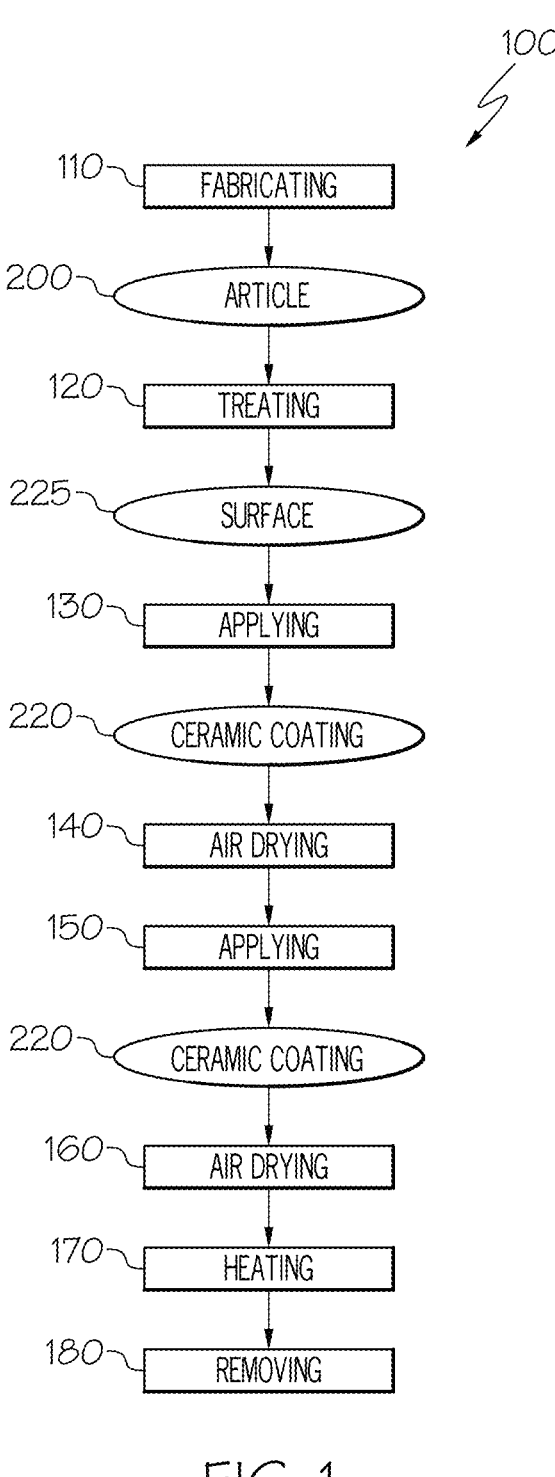
FIG. 1 is a block diagram of a method for inhibiting alpha case on an article.

Referring to FIG. 1, disclosed is a method 100 for inhibiting alpha case on an article 200 by providing a high temperature (1200 to 1800° F.) barrier coating on the surface of an article. The article 200 may be fabricated from (or may otherwise include) titanium or a titanium alloy. As one specific, non-limiting example, the article 200 may be fabricated from (or may otherwise include) Ti-6Al-4V.

The method 100 may begin with the step of fabricating 110 the article 200. For example, the fabricating 110 may include additive manufacturing. Fabricating 110 using techniques other than additive manufacturing, such as casting, forging, machining, and the like, are also contemplated.

Still referring to FIG. 1, the method 100 may further include the step of treating 120 the surface 225 of the article 200. The treating 120 step may be performed after the fabricating 110 step and prior to the other steps depicted in FIG. 1. In one example, the treating 120 the surface 225 includes impinging the surface 225 with abrasive blasting media, such as with abrasive blasting media that includes aluminum oxide.

Still referring to FIG. 1, the method 100 further includes applying 130 a ceramic coating 220 to the surface 225 of the article 200. In one example, the applying 130 includes applying 130 the ceramic coating 220 to the surface 225 of the article 200 to achieve a nominal coating thickness of at least about 1 mil. In another example, the applying 130 includes applying 130 the ceramic coating 220 to the surface 225 of the article 200 to achieve a nominal coating thickness of about 1 to about 30 mils. In another example, the applying 130 includes applying 130 the ceramic coating 220 to the surface 225 of the article 200 to achieve a nominal coating thickness of at least about 3 mil. In another example, the applying 130 includes applying 130 the ceramic coating 220 to the surface 225 of the article 200 to achieve a nominal coating thickness of about 3 to about 25 mils. In another example, the applying 130 includes applying 130 the ceramic coating 220 to the surface 225 of the article 200 to achieve a nominal coating thickness of about 5 to about 20 mils. In yet another example, the applying 130 includes applying 130 the ceramic coating 220 to the surface 225 of the article 200 to achieve a nominal coating thickness of about 7 to about 15 mil.

Figure 3:
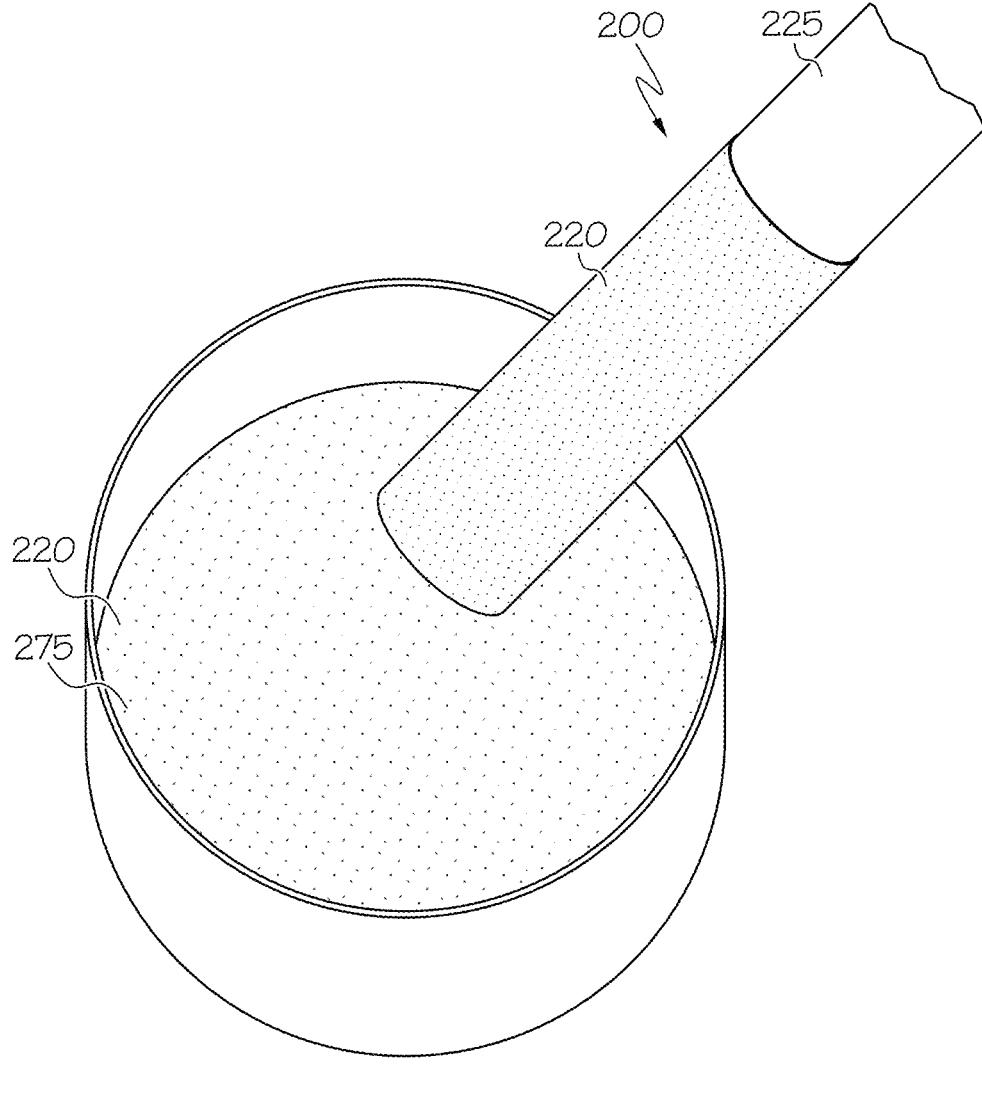
FIG. 3 is a perspective view of an article manufactured by the method of FIG. 1.

In one or more examples, the applying 130 includes applying 130 a slurry composition 275 (FIG. 3) to the surface 225 of the article 200 to yield the ceramic coating 220. Referring to FIG. 3, in one example, the applying 130 the slurry composition 275 includes dipping the article 200 into the slurry composition 275. In another example, the applying 130 the slurry composition 275 includes brushing the slurry composition 275 onto the article 200. In yet another example, the slurry composition 275 is a water-based slurry.

As one specific, non-limiting example, the slurry composition 275 that yields the ceramic coating 220 on the article 200 may be a water-based slurry, and may include silicate and calcium. Therefore, the resulting ceramic coating 220 may include silicate and calcium. In another example, the ceramic coating 220 may further include aluminum. In another example, the ceramic coating 220 may further include titanium. In yet another example, the ceramic coating 220 may further include both titanium and aluminum.

The ceramic coating 220 has a coefficient of thermal expansion. In one example, the coefficient of thermal expansion of the ceramic coating 220 is substantially the same as a coefficient of thermal expansion of the article 200. In another example, the ceramic coating 220 has a first coefficient of thermal expansion and the article 200 has a second coefficient of thermal expansion that is different than the first coefficient of thermal expansion. In one example, the difference between the first coefficient of thermal expansion and the second coefficient of thermal expansion is at most ±5 percent, or a difference of from 1 to about 15 percent. In another example, the difference between the first coefficient of thermal expansion and the second coefficient of thermal expansion is at most ±10 percent, or from 5 to about 15 percent. In yet another example, the difference between the first coefficient of thermal expansion and the second coefficient of thermal expansion is at most ±15 percent.

Referring back to FIG. 1, the method 100 may further include the step of air drying 140 the article 200 after applying 130 the slurry composition 275 to the surface 225, thereby yielding a dry ceramic coating 220 on the surface 225 of the article 200. In some examples, the air drying 140 is performed at ambient conditions. In other examples, the air drying 140 is performed at a temperature between about 70° F. to about 125° F.

The step of air drying 140 the article 200 after applying 130 the slurry composition 275 may be performed for a duration of time sufficient to achieve a desired moisture content within the resulting ceramic coating 220. In one example, the air drying 140 is performed for a duration of time sufficient to achieve an equilibrium moisture content within the resulting ceramic coating 220. In another example, the air drying 140 is performed for at least about 10 minutes, or about 10 minutes to about 1 hour. In another example, the air drying 140 is performed for at least about 15 minutes, or about 15 minutes up to about 45 minutes. In yet another example, the air drying 140 is performed for about 30 minutes to about 90 minutes.

Still referring to FIG. 1, the method 100 may further include the step of, after the air drying 140, applying 150 an additional layer of the ceramic coating 220 over the dry ceramic coating 220 on the surface 225 of the article 200.

In one or more examples, the applying 150 includes applying 150 a slurry composition 275 to the previously applied and dried ceramic coating 220 to yield an even thicker ceramic coating 220. The slurry composition 275 used during the second/subsequent step(s) of applying 150 may be compositionally the same as (or at least similar to) the slurry composition 275 used during the initial step of applying 130.

The step of applying 150 an additional layer of the ceramic coating 220 may optionally be repeated a number of times to achieve the desired total coating thickness of the resulting ceramic coating 220. In one example, the applying 150 an additional layer yields a nominal coating thickness of the ceramic coating 220 of at least about 3 mil, or from about 3 to about 25 mils. In another example, the applying 150 yields a nominal coating thickness of the ceramic coating 220 of at least about 5 mil, or from about 5 to about 20 mils. In yet another example, the applying 150 yields a nominal coating thickness of the ceramic coating 220 of at least about 7 mil.

Referring to FIG. 3, in one example, the applying 150 the slurry composition 275 includes dipping the article 200 into the slurry composition 275. In another example, the applying 150 the slurry composition 275 includes brushing the slurry composition 275 onto the article 200. In yet another example, the applying 150 the slurry composition 275 includes spraying the slurry composition 275 of the ceramic coating 220 onto the article 200. In one another example, the slurry composition 275 is a water-based slurry.

Referring back to FIG. 1, the method 100 may further include the step of air drying 160 the article 200 after applying 150 the additional layer of the ceramic coating 220. The steps of applying an additional layer of ceramic coating 220 to the article 200 and subsequently air drying 160 the additional layer may be repeated multiple times until the desired coating thickness of the ceramic coating 220 is achieved.

Still referring to FIG. 1, the method 100 further includes heating 170 the article 200 with the applied ceramic coating 220. The heating 170 the article 200 may be performed at a temperature and for a duration of time sufficient to substantially relieve stresses within the article 200. In one example, the heating 170 occurs at a temperature of at least 800° F. In another example, the heating 170 occurs at a temperature of at least 1000° F. In another example, the heating 170 occurs at a temperature of at least 1200° F., or 1200 to about 1800° F. In another example, the heating 170 occurs at a temperature of at least 1500° F. In another example, the heating 170 occurs at a temperature of at least 800° F. for at least 30 minutes. In another example, the heating 170 occurs at a temperature of at least 800° F. for at least 60 minutes to about 20 hours. In another example, the heating 170 occurs at a temperature of at least 800° F. for at least 90 minutes to about 10 hours. In yet another example, the heating 170 occurs at a temperature of at least 800° F. for at least 120 minutes.

Various techniques may be used for heating 170 the article 200 and the ceramic coating 220 without departing from the scope of the present disclosure. In one specific, non-limiting example, the heating 170 includes hot isostatic pressing. The use of other thermo-mechanical or thermo-pneumatic processes for heating is also contemplated.

Referring to FIG. 1, the method 100 may further include the step of removing 180 the ceramic coating 220 after the heating 170. The removing 180 may be achieved by mechanically scraping, chemically removing by submerging in a liquid or spraying with a liquid, or any other suitable means of removing the ceramic coating 220. Upon completion of the method 100, the article 200 may be substantially free of alpha case.

Figure 2:
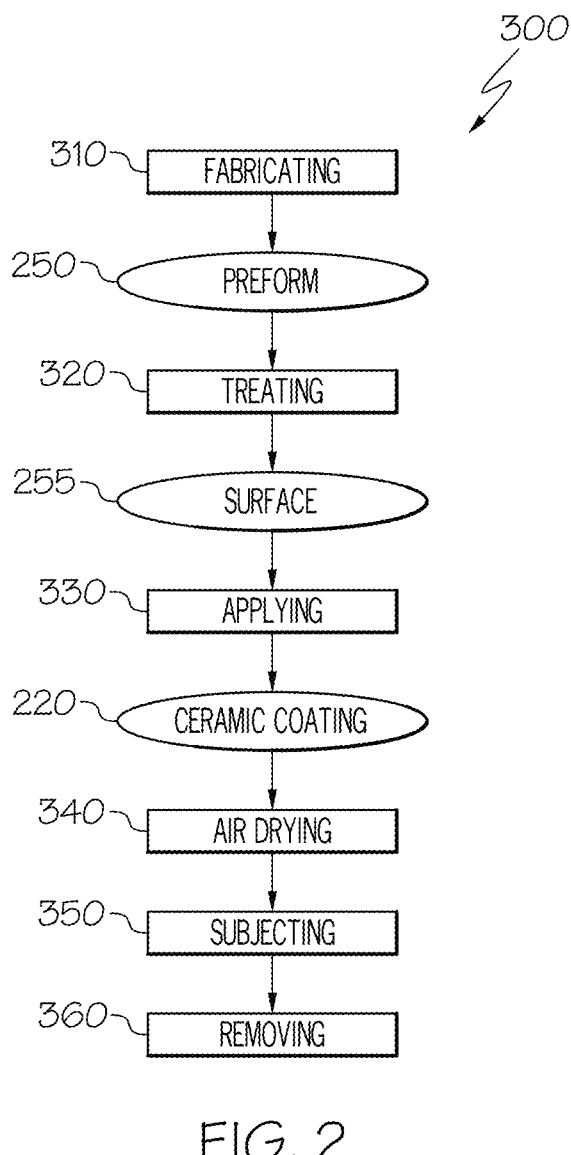
FIG. 2 is a block diagram of a method for manufacturing a titanium article that is substantially free of alpha case.

Referring to FIG. 2, also disclosed is a method 300 for manufacturing an article 235 that is substantially free of alpha case. The article 235 may be fabricated from (or may otherwise include) titanium or a titanium alloy. As one specific, non-limiting example, the article 200 may be fabricated from (or may otherwise include) Ti-6Al-4V.

The method 300 may begin with the step of fabricating 310 a preform 250. In specific, non-limiting example, the method includes fabricating 310 a preform 250 by additive manufacturing.

Still referring to FIG. 2, the method 300 may further include the step of treating 320 the surface 255 of the preform 250 prior to applying 330 a ceramic coating 220 to the surface 255. In one example, the treating 320 the surface 255 includes impinging the surface 255 with abrasive blasting media, such as abrasive blasting media that includes aluminum oxide.

Still referring to FIG. 2, the method 300 further includes the step of applying 330 a ceramic coating 220 to the surface 255 of the preform 250. In one example, the ceramic coating 220 has a nominal coating thickness of at least about 1 mil. In another example, the ceramic coating 220 has a nominal coating thickness of about 1 to about 30 mil. In another example, the ceramic coating 220 has a nominal coating thickness of about 3 to about 25 mil. In another example, the ceramic coating 220 has a nominal coating thickness of about 5 to about 20 mil. In yet another example, ceramic coating 220 has a nominal coating thickness of about 7 to about 15 mil.

In one example, the applying 330 the ceramic coating 220 includes dipping the preform 250 into a slurry composition 275 (FIG. 3), such as a water-based slurry. In another example, the applying 330 includes brushing the slurry composition 275 onto the preform 250. In yet another example, the applying 330 includes spraying the slurry composition 275 onto the preform 250. The slurry can also be applied by hand.

Still referring to FIG. 2, the method 300 may further include air drying 340 the preform 250 after applying 330 the ceramic coating 220 to yield a dry ceramic coating 220 on the surface 255 of the preform 250. In one example, the air drying 340 is performed for at least about 10 minutes. In another example, the air drying 340 is performed for about 10 to about 60 minutes. In another example, the air drying 340 is performed for about 15 to about 45 minutes. In another example, the air drying 340 is performed for about 30 to about 90 minutes. In one or more examples, the air drying 340 is performed at a temperature between about 70° F. to about 125° F. In another example, the steps of applying 330 and air drying 340 are repeated until a desired coating thickness of the ceramic coating 220 is achieved.

Still referring to FIG. 2, the method 300 further includes the step of, while the ceramic coating 220 is applied to the surface 255, subjecting 350 the preform 250 to hot isostatic pressing. In one example, the subjecting 350 is performed at a temperature and for a duration of time sufficient to substantially relieve stresses within the preform 250. In one example, the subjecting 350 is performed at a temperature that reaches a minimum of 800° F. In one example, the subjecting 350 is performed at a temperature that reaches a minimum of 900° F. In another example, the subjecting 350 is performed at a temperature that reaches a minimum of 1000° F. In yet another example, the subjecting 350 is performed at a temperature between about 1200° F. and about 1800° F.

Still referring to FIG. 2, the method 300 may further include the step of, after hot isostatic pressing, removing 360 the ceramic coating 220. The removing 360 may be achieved by mechanically scraping, chemically removing by submerging in a liquid or spraying with a liquid, or any other suitable means of removing the ceramic coating 220.

Also disclosed are slurry compositions 275 (FIG. 3) for inhibiting alpha case on titanium and titanium alloys, such as in accordance with method 100 (FIG. 1) and/or method 300 (FIG. 2). In one or more examples, the ceramic coating 220 is derived from the slurry composition 275. In one example, the slurry composition 275 is water-based slurry.

In one or more examples, the slurry composition 275 includes at least 20 percent by weight water, such as about 25 to about 50 percent by weight water. In one example, the slurry composition 275 includes at least 50 percent by weight silicate, such as about 60 to about 70 percent by weight silicate. In another example, the slurry composition 275 includes about 65 percent by weight silicate. In one example, the slurry composition 275 includes at least 5 percent by weight calcium, such as about 6 to about 10 percent by weight calcium. In another example, the slurry composition 275 includes about 8 percent by weight calcium. In one example, the slurry composition 275 includes at least 10 percent by weight aluminum, such as about 15 to about 19 percent by weight aluminum. In another example, the slurry composition 275 includes about 17 to about 18 percent by weight aluminum. In one example, the slurry composition 275 includes at least 0.1 percent by weight iron, such as about 0.25 to about 0.75 percent by weight iron. In another example, the slurry composition 275 includes about 0.5 to about 0.6 percent by weight iron. In one example, the slurry composition 275 includes at least 0.5 percent by weight titanium, such as about 1 to about 2 percent by weight titanium.

Figure 6:
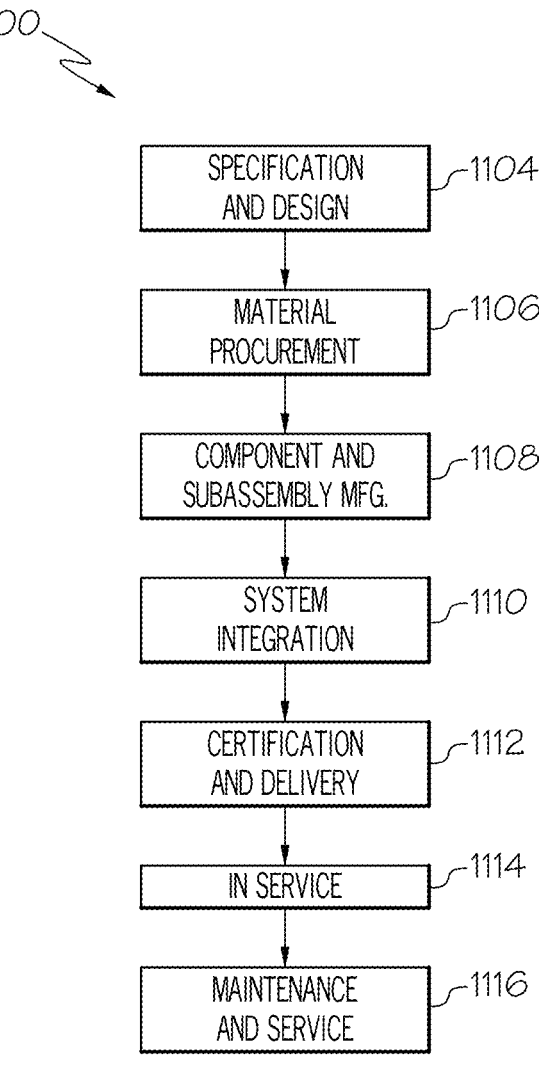
FIG. 6 is a block diagram of aircraft production and service methodology.
Figure 7:
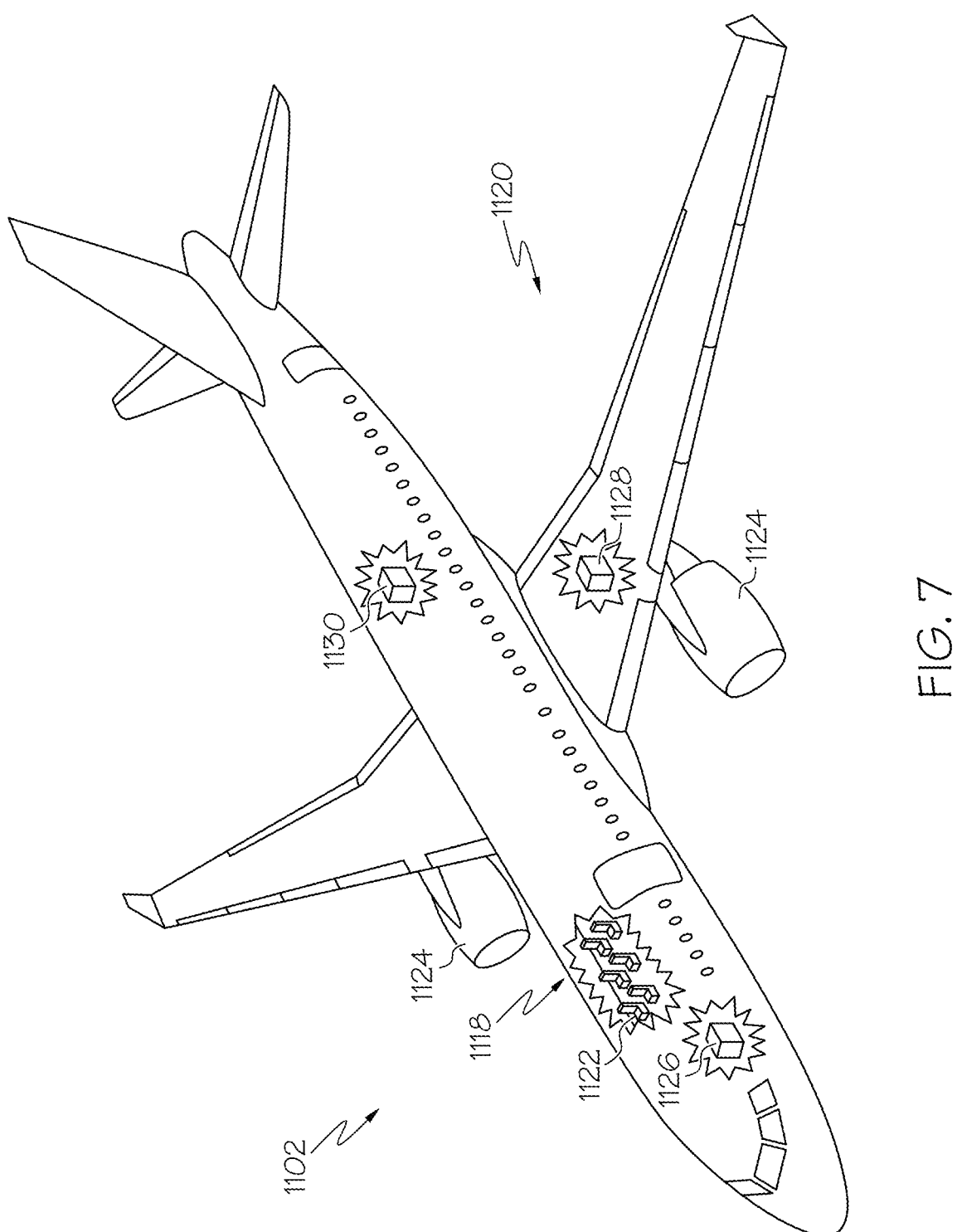
FIG. 7 is a schematic illustration of an aircraft.

Examples of the subject matter disclosed herein may be described in the context of aircraft manufacturing and service method 1100 as shown in FIG. 6 and aircraft 1102 as shown in FIG. 7. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (block 1108 and block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

The resulting methods described herein provide a high temperature (1200-1800° F.) barrier coating on the surface of a part, such as an additive manufactured part, such that, in embodiments, the coating prevents diffusion of oxygen, nitrogen and carbon on the surface of the part at an elevated temperature.

Example

Figure 4:
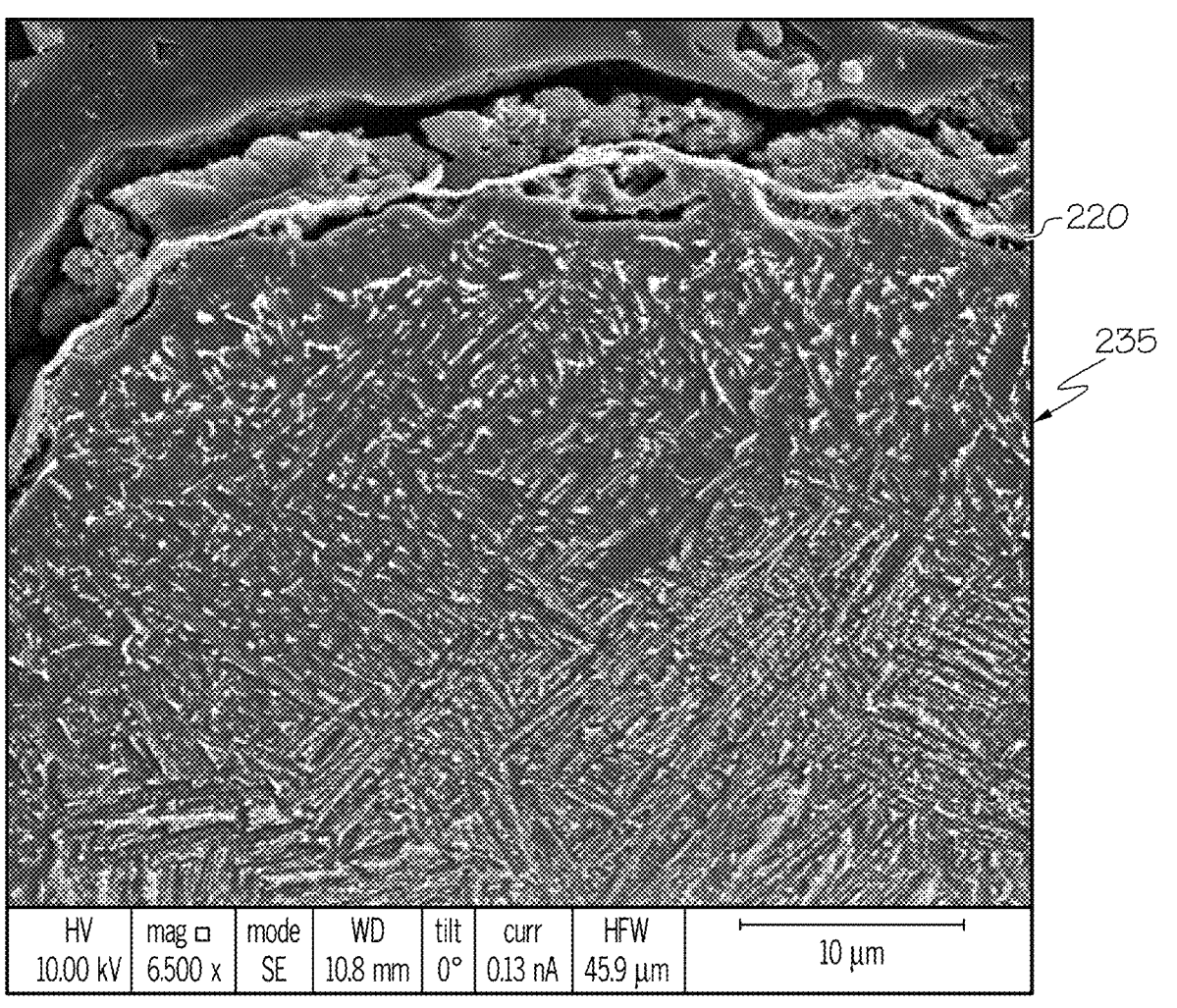
FIG. 4 is a scanning electron microscope micrograph of a portion of a titanium article coated with a ceramic coating in accordance with the method of FIG. 2.
Figure 5:
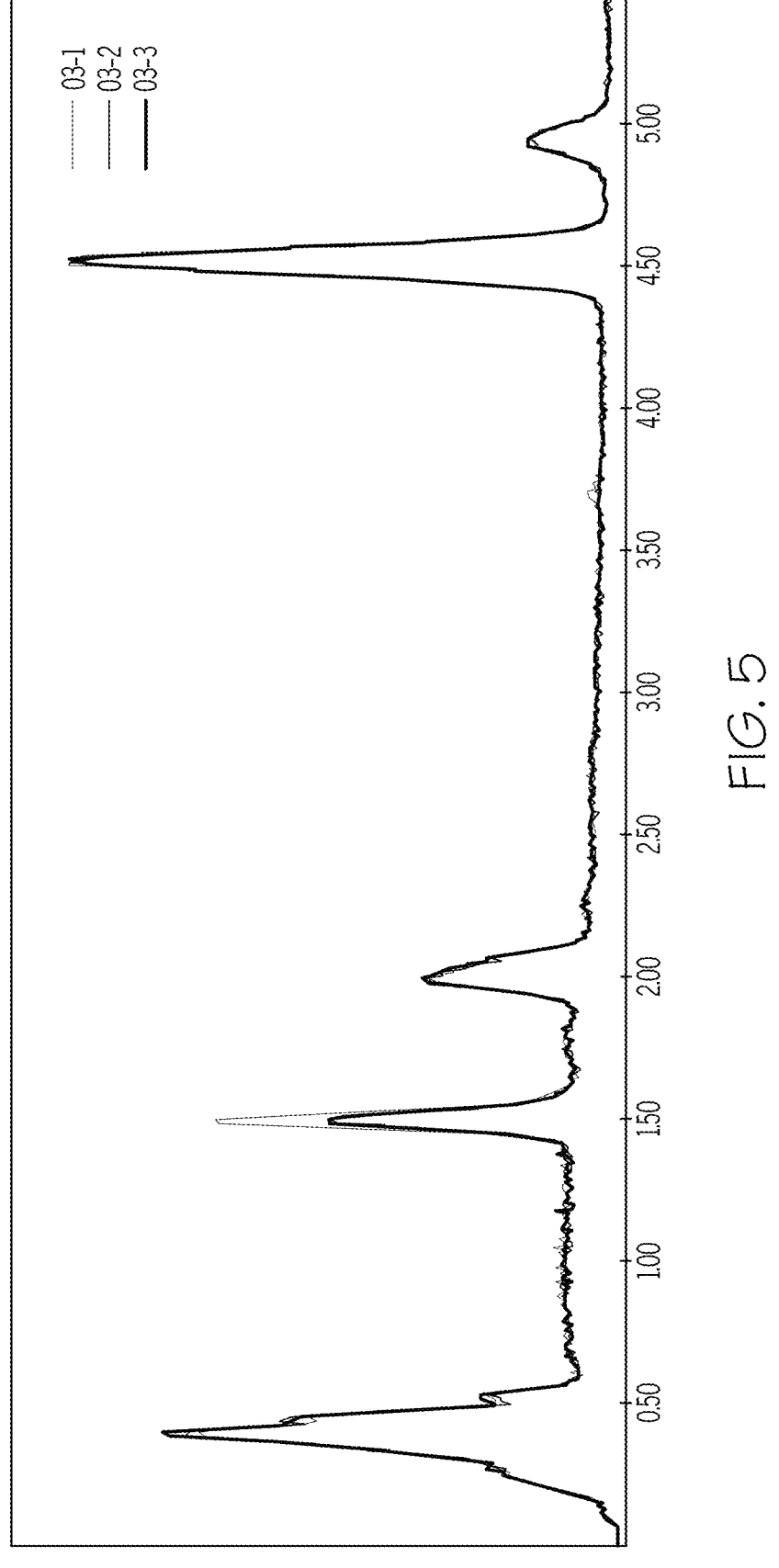
FIG. 5 is a graph of energy-dispersive X-ray spectroscopy data obtained from the portion of the article shown in FIG. 4.

A titanium article 235 comprising Ti-6Al-4V base material was produced in accordance with the disclosed method 300 and analyzed prior to removal of the ceramic coating 220. Referring to FIG. 4 and FIG. 5, the titanium article 235 was characterized by conventional techniques to determine effectiveness of the method 300. Microstructure and phase composition of the titanium article 235 and ceramic coating 220 were studied using scanning electron microscopy ("SEM") and Energy Dispersive X-Ray Spectroscopy ("EDX"). The above-mentioned techniques were used to determine the chemical composition and alpha/beta microstructural evaluation of the titanium article 235 and of the surface 255. For the SEM analyses, the sample was mounted in resin, grinded, and polished. FIG. 4 illustrates the microstructure of titanium article 235 with ceramic coating 220. SEM imaging revealed Alpha/Beta basketweave microstructure of the titanium article 235.

As illustrated in FIG. 5, a graph of EDX analysis of the base material and surface 255 shows no diffused layers present in the microstructure. Thus, no alpha case formed on the surface 255 of the titanium article 235 when the titanium article 235 was manufactured in accordance with method 300.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A method for inhibiting alpha case on an article, the method comprising:

fabricating the article by additive manufacturing;

applying a ceramic coating to a surface of the fabricated article, wherein the article comprises titanium or titanium alloy, wherein the ceramic coating is applied as a slurry that comprises: water; silicate; calcium; aluminum; iron; and titanium;

while the ceramic coating is applied to the surface of the article, heating the article to a temperature of at least 800° F.;

removing the ceramic coating after the heating, wherein the ceramic coating is entirely removed; and treating the surface of the article prior to the applying the ceramic coating, wherein treating the surface of the article includes impinging the surface of the article with abrasive blasting media, wherein a difference between a coefficient of thermal expansion of the ceramic coating and a coefficient of thermal expansion of the article is at most ±5 percent.

2. The method of claim 1, wherein the applying comprises dipping the article into a slurry composition or brushing the slurry composition onto the article.

3. The method of claim 1, wherein the ceramic coating comprises aluminum, titanium, or mixtures thereof.

4. The method of claim 1, wherein the applying comprising applying the ceramic coating to the surface of the article to achieve a nominal coating thickness of at least about 1 mil.

5. The method of claim 1, wherein the applying comprising applying the ceramic coating to the surface of the article to achieve a nominal coating thickness of at least about 3 mil.

6. The method of claim 1, wherein the heating the article comprises hot isostatic pressing.

7. The method of claim 1, wherein the heating the article is performed at a temperature of at least 800° F. for at least 30 minutes.

8. The method of claim 1, wherein the heating comprises heating the article to a temperature of at least 900° F.

9. The method of claim 1, further comprising air drying the article after applying the ceramic coating to yield a dry ceramic coating on the surface of the article.

10. The method of claim 9, further comprising, after the air drying, applying an additional layer of the ceramic coating over the dry ceramic coating.

11. The method of claim 10, further comprising air drying the article after applying the additional layer of the ceramic coating.

12. The method of claim 9, further comprising, after the air drying, applying more than one additional layer of the ceramic coating and air drying the article after each step of applying the more than one additional layer of the ceramic coating.

13. The method of claim 1, wherein removing the ceramic coating comprises at least one of mechanical scraping of the ceramic coating and chemically removing the ceramic coating.

14. A method for manufacturing a titanium article, the method comprising:

fabricating a preform by additive manufacturing;

treating a surface of the preform, wherein treating the surface of the preform includes impinging the surface of the preform with abrasive blasting media;

applying a ceramic coating to the treated surface of the preform, the ceramic coating having a nominal coating thickness of at least about 1 mil, wherein the ceramic coating is applied as a slurry that comprises: water; silicate; calcium; aluminum; iron; and titanium;

while the ceramic coating is applied to the surface, subjecting the preform to hot isostatic pressing; and after hot isostatic pressing, removing the ceramic coating, wherein the ceramic coating is entirely removed, and wherein a difference between a coefficient of thermal expansion of the ceramic coating and a coefficient of thermal expansion of the preform is at most ±5 percent.

15. The method of claim 14, wherein removing the ceramic coating comprises at least one of mechanical scraping of the ceramic coating and chemically removing the ceramic coating.

16. The method of claim 14, wherein the slurry composition includes about 60 to about 70 percent by weight silicate.

17. The method of claim 14, wherein the slurry composition includes about 6 to about 10 percent by weight calcium.

18. The method of claim 14, wherein the slurry composition includes about 16 to about 19 percent by weight aluminum.

19. The method of claim 14, wherein the slurry composition includes about 0.3 to about 7 percent by weight iron.

20. The method of claim 14, wherein the slurry composition includes about 1 to about 2 percent by weight titanium.

\*   \*   \*   \*   \*